US009995921B2

(12) United States Patent
Larson

(10) Patent No.: US 9,995,921 B2
(45) Date of Patent: Jun. 12, 2018

(54) SURFACE ADHERING LENS

(71) Applicant: Cell Focus, LLC, Olympia, WA (US)

(72) Inventor: Thomas Edward Larson, Olympia, WA (US)

(73) Assignee: Cell Focus, LLC, Olympia, WA (US)

( * ) Notice: Subject to any disclaimer, the term of this patent is extended or adjusted under 35 U.S.C. 154(b) by 867 days.

(21) Appl. No.: 14/298,157

(22) Filed: Jun. 6, 2014

(65) Prior Publication Data

US 2014/0362239 A1 Dec. 11, 2014

Related U.S. Application Data

(60) Provisional application No. 61/832,092, filed on Jun. 6, 2013.

(51) Int. Cl.
| G02B 21/36 | (2006.01) |
| G02B 1/04 | (2006.01) |
| G02B 21/02 | (2006.01) |
| G02B 13/00 | (2006.01) |
| G02B 3/00 | (2006.01) |
| G02B 21/00 | (2006.01) |
| B29D 11/00 | (2006.01) |
| B29K 83/00 | (2006.01) |
| H04N 5/225 | (2006.01) |

(52) U.S. Cl.
CPC ...... G02B 21/361 (2013.01); B29D 11/00028 (2013.01); G02B 1/041 (2013.01); G02B 3/0081 (2013.01); G02B 13/0025 (2013.01); G02B 13/0085 (2013.01); G02B 21/0008 (2013.01); G02B 21/02 (2013.01); B29K 2083/00 (2013.01); H04N 5/2254 (2013.01)

(58) Field of Classification Search
None
See application file for complete search history.

(56) References Cited

U.S. PATENT DOCUMENTS

| 4,783,155 A * | 11/1988 | Imataki ............... G02B 3/14 359/666 |
| 7,906,072 B2 | 3/2011 | Unger et al. |
| 7,986,465 B1 * | 7/2011 | Lo ............... G02B 3/14 359/665 |
| 8,048,378 B2 | 11/2011 | Unger et al. |
| 8,512,640 B2 | 8/2013 | Unger et al. |

(Continued)

FOREIGN PATENT DOCUMENTS

DE 3702188 C2 * 7/1987 ............ G02B 1/041

OTHER PUBLICATIONS

DE 3702188C2 English machine translation from EPO (1987).*

(Continued)

*Primary Examiner* — Kenneth J Stachel
(74) *Attorney, Agent, or Firm* — Seed IP Law Group LLP

(57) ABSTRACT

A lens structure includes an elastomer formed as a lens. The lens has a planar surface and a curved surface opposed to the planar surface. The elastomer of the lens structure may be formed of a base polymer polydimethylsiloxane (PDMS) material. When the lens structure is applied proximate to a camera sensor array of an electronic device, such as a cell phone or a tablet, the combination can function as microscope. By altering parameters of the lens, such as the radius of curvature, it is possible to achieve a wide range of magnification.

20 Claims, 11 Drawing Sheets

(56) References Cited

U.S. PATENT DOCUMENTS

| | | | |
|---|---|---|---|
| 8,721,968 B2 | 5/2014 | Unger et al. | |
| 8,743,194 B2 | 6/2014 | Fletcher et al. | |
| 2007/0268694 A1* | 11/2007 | Bailey | G02B 27/0955 362/231 |
| 2010/0182703 A1* | 7/2010 | Bolis | G02B 3/14 359/666 |
| 2011/0038028 A1* | 2/2011 | Dharmatilleke | G02B 3/14 359/290 |
| 2011/0261318 A1* | 10/2011 | Spratt | B29D 11/00028 351/159.14 |
| 2011/0290887 A1* | 12/2011 | Wang | G02B 3/14 235/470 |
| 2012/0081795 A1* | 4/2012 | Choi | G02B 3/14 359/665 |
| 2012/0200943 A1* | 8/2012 | Gallagher | B29D 11/00307 359/737 |
| 2012/0261551 A1* | 10/2012 | Rogers | G02B 3/14 250/208.1 |

OTHER PUBLICATIONS

Tunable Polymer Lens article G Beadie Jul. 24, 2008.*
Arpa et al., "Single Lens Off-Chip Cellphone Microscopy," IEEE Int. Workshop on Projector-Camera Systems, 2012, 6 pages.

* cited by examiner

SURFACE ADHERING LENS

CROSS-REFERENCE(S) TO RELATED APPLICATION(S)

This application claims the benefit under 35 U.S.C. § 119(e) of U.S. Provisional Patent Application No. 61/832,092, filed Jun. 6, 2013, where this provisional application is incorporated herein by reference in its entirety.

BACKGROUND

Technical Field

The present disclosure generally relates to soft lens structures. More particularly, but not exclusively, the present disclosure relates to one or more self-adhering lenses and methods to make and use the self-adhering lenses.

Description of the Related Art

Microscopes are an essential part of the modern world. Conventional optical microscopes use one or more lenses to produce a magnified view of small objects; especially of objects too small to be seen by the naked eye. A typical optical microscope may have a magnification factor from about 50 times to about 1000 times. Thus, when an object or portion of an object (i.e., a specimen) is placed under the lens of a microscope, a user can see the specimen as if it were 50 to 1000 times larger.

An optical microscope gathers light from a tiny area of a thin, well-illuminated specimen. A small objective lens focuses light from the illuminated specimen into a tube of the microscope. The objective lens includes a first focal point on the side of the specimen and a second focal point on the side of the microscope tube. Both focal lengths are relatively short. The image at the focal point within the microscope tube is then magnified by a second lens, which may also be called an ocular lens or an eyepiece.

Optical microscopes have a myriad of uses, including health and education. Optical microscopes are a commonly accepted means for diagnosing diseases including malaria, tuberculosis, anemia, sickle cell disease, and many parasitic-borne maladies. They can also be used to screen for cancers, including breast cancer, cervical cancer, and other cancers. Optical microscopes are used in schools to facilitate the teaching of biology and other subjects. Microscopes are present in homes and utilized in hobbies, education, entertainment, and for other reasons.

FIG. 1 illustrates a conventional optical microscope 10. A frame 12 of the microscope supports the microscope body (i.e., tube) 14 and the microscope stage (i.e., table) 16. A light source 18 is used to condense, direct, or otherwise concentrate light upwards toward the microscope stage 16. In some cases, the light source 18 includes a mirror or lens that gathers ambient light and directs the ambient light such that the light converges on the table 16. In some cases, the light source 18 produces the light that is concentrated on the table 16. The light source 18 focuses the gathered or sourced light into a tiny, bright spot on the specimen in the area where the objective lens is focused.

The microscope 10 of FIG. 1 includes a rotating objective lens assembly 20 with a first objective lens 22a and a second objective lens 22b. Other embodiments have only one objective lens or more than two objective lenses. The first and second objective lenses 22a, 22b of the microscope 10 of FIG. 1 have different optical properties. In the embodiment, the first objective lens is relatively flat and has a low-magnification while the second objective lens is rounder and has a higher magnification. In this way the first lens provides a view of the specimen at one level and the second lens brings the specimen into view at a smaller level. In cases where more than two objective lenses are included in the objective lens assembly 20, increasingly smaller areas of the specimen can be brought into view.

In many cases, each objective lenses of an objective lens assembly 20 will focus the image at the same point within the microscope tube 14. In this way, an ocular lens (i.e., an eyepiece) 24 can be permanently affixed at the end of the microscope body 14. The ocular lens 24 magnifies the image produced by the ocular lens 22a, 22b and focuses the image onto the eye of a user.

Various focusing mechanisms can be used in a conventional microscope. In the microscope 10 of FIG. 1, a coarse focus knob 26 engages a first geared-travel mechanism (not shown) to move the microscope body 14 up and down. A fine focus knob 28 engages a second travel mechanism (not shown) to move the microscope table 16 up and down. Other focusing mechanisms are available in conventional microscopes.

Despite the importance of their applications, and the benefits they provide, conventional microscopes face many limitations. Conventional optical microscopes can be bulky and cumbersome, expensive, and comprised of many fragile components. Most conventional microscopes are not capable of capturing and transmitting images and videos without the addition of external equipment.

BRIEF SUMMARY

In accordance with some embodiments described herein, a soft polymer convex lens is made from an elastomer such as polydimethylsiloxane (PDMS). When such a lens is applied proximate a camera sensor array of an electronic device such as a cell phone or tablet, the combination can function as microscope. By altering parameters of the lens, such as radius of curvature, it is possible to achieve a wide range of magnification. In addition to providing magnification, other optical modifications are possible.

Embodiments of the lens structures form a lens from an elastomer. The lens has a planar surface and a curved surface opposed to the planar surface. The elastomer includes a base polymer polydimethylsiloxane (PDMS) material and in some cases, a cross-linking material. In such embodiments, the cross-linking material and base polymer PDMS material are mixed in about a 1:15 ratio. The lens structure may have a wafer portion and a hemispherical portion; the wafer portion having at least one dimension larger than the diameter of the hemispherical portion. In some of the embodiments, the curved surface of the lens structure is a convex lens surface having a radius of curvature of 3.175 mm and a height that protrudes at least 0.75 mm above the wafer. This lens structure may provide a magnification of about 15×. In other embodiments, the curved surface has a radius of curvature of 0.5 mm and a height that protrudes at least 0.25 mm above the wafer, which is about 0.75 mm thick. This lens structure may provide a magnification of about 150×. Some lens structures are formed with a curved surface having a constant radius. Some lens structures are formed with a curved surface having an aspheric shape.

Embodiments of lens structures described herein can be used by positioning the lens structure over an image sensor of a computing device, operating a camera application of the computing device, and capturing at least one image with the computing device. In some cases, a sequence of images are captured and stored as a video stream. The lens structure can be re-positioned over the image sensor, and in some embodiments, the lens structure can be compressed to effect a change in optical properties of the lens structure. A specimen placed in proximity to the lens structure can be back-lit, which may improve image quality.

Embodiments of lens structures described herein can be formed by preparing a lens structure mold to receive an elastomer, depositing the elastomer in the lens structure mold, waiting for the elastomer to cure, and removing the cured elastomer from the lens structure mold. The lens structure mold in some embodiments has at least one curved surface polished to an optical quality. In some embodiments, the elastomer used to form the lens structures includes a base polymer polydimethylsiloxane (PDMS) material and a cross-linking material; the cross-linking material to base polymer PDMS material mixture has a ratio of about 1:10 to 1:20, for example, 1:12, 1:15, or 1:18. The preparation of the lens structures may also include an act of heating the lens structure mold. In some cases, a lens structure mold has a plurality of curved surfaces polished to the optical quality to form more than one lens structure at a time. In these cases, after the elastomer has cured, each one of the plurality of lens structures is separated. The formation of lens structures may, in some cases, include the act of depositing an opacifier material in the lens structure mold, for example, in a mixture that includes PDMS and an opacifier dye.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIGS. 9A-9D illustrate non-limiting embodiments of computing devices that a lens structure may be coupled to;

DETAILED DESCRIPTION

The present disclosure relates to a soft polymer lens, which is coupleable to an image capturing means such as a smartphone, a tablet, a laptop computer, or other like computing device. The combination of the lens and the computing device permits functionality including but not limited to a microscope, magnifying lens, wide-angle lens, macro lens, filtering lens, or another device having modified optical capabilities. By altering parameters to create different lens embodiments, such as the radius of curvature for example, it is possible to achieve a wide range of magnification. Some lens embodiments may work as macro lenses. Other lens embodiments may work as micro lenses. Still other lens embodiments are arranged to work between macro and micro lenses. In one embodiment, a lens is arranged to clearly focus on the nuclei of cells. In this and in different embodiments, a lens is arranged to magnify an image of a specimen and focus the magnified image onto an image capturing means. In these or in still other embodiments, different parameters of the lens may be adjusted such that the lens is used to filter light inside or outside the visible spectrum, correct particular optical aberrations, or for other purposes.

Figure 1:
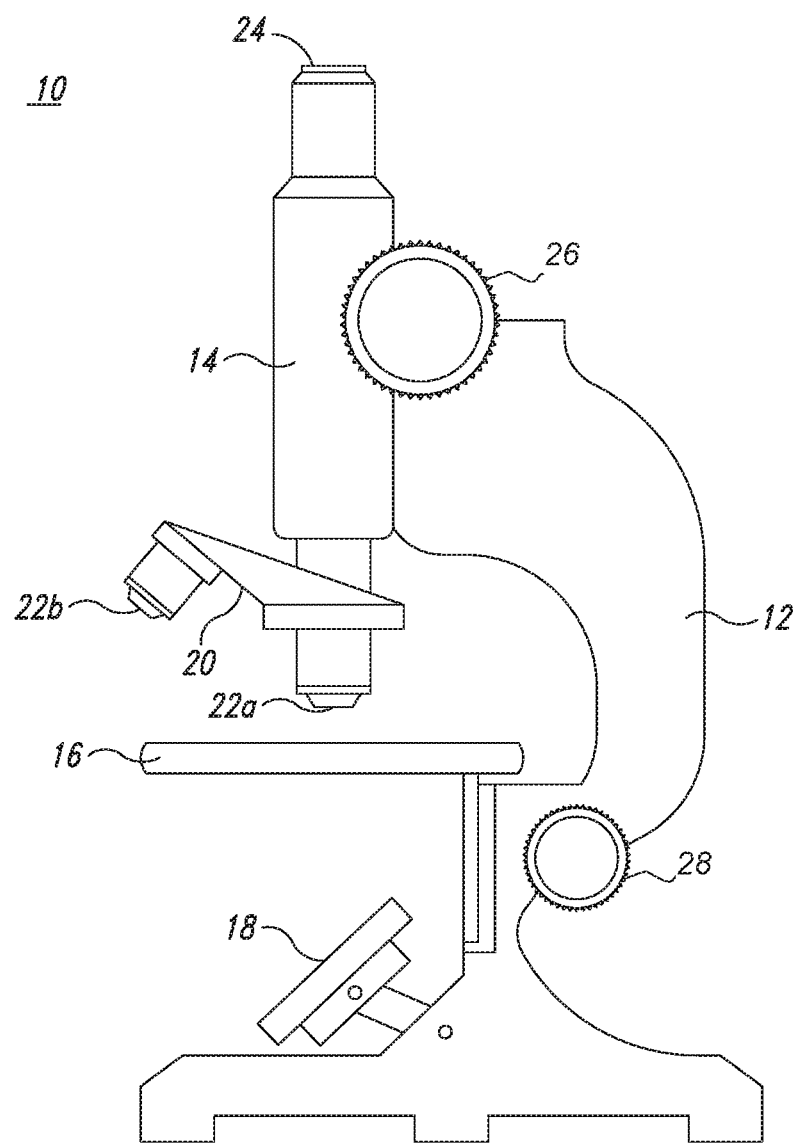
FIG. 1 illustrates a conventional optical microscope.
Figure 2A:
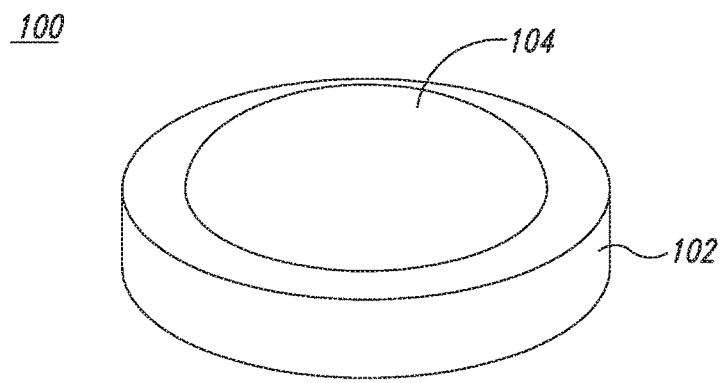
FIGS. 2A-2C are a perspective view (i.e., an isometric view) of a lens embodiment, a side view of the lens embodiment, and a top view of the lens embodiment.
Figure 2B:
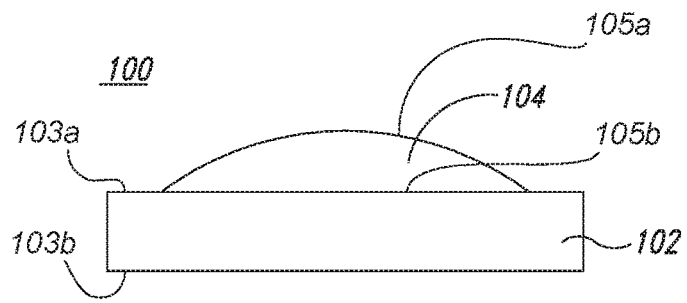
Figure 2C:
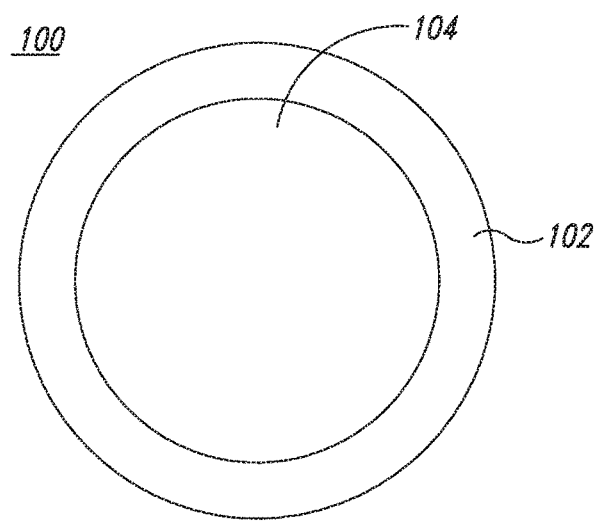

FIGS. 2A-2C illustrate one embodiment of a soft polymer lens structure 100. FIG. 2A is a perspective view (i.e., an isometric view), FIG. 2B is a side view, and FIG. 2C is a top view of the lens structure 100. In the embodiment, lens structure 100 is formed as a soft polymer wafer or wafer-like structure 102 with a lens 104. The lens 104 has a protruding convex surface 105a. In other embodiments, the lens structure 100 may be formed with a different profile such as a concave surface, a non-linear surface, a multi-faceted surface, or some other surface. The convex lens portion 104 of FIGS. 2A-2C may be aspherical or hemispherical; or as illustrated in FIG. 2B, the convex lens has a protruding convex surface which is formed as a hemispherical lens having a planar surface and a curved surface opposed to the planar surface where the convex lens may have a curvature that is spherical, aspherical, or parabolic. As illustrated in FIG. 2B, the wafer structure has a top planar surface 103a and a bottom planar surface 103b and the convex lens portion 105b has a protruding convex surface which is formed as a hemispherical lens. The lens structure 100 can be a soft polymer lens structure made of an elastomer such as polydimethylsiloxane (PDMS). The lens structure 100 can be arranged to self-adhere in proximity to a camera integrated into or otherwise available to a computing device. The lens embodiment permits the computing device and lens combination to perform as a microscope, a magnifying glass, or another lens device having a power and properties substantially determined by the lens.

Embodiments of the lens have applications relevant to many fields including medicine, education, photography, industry, and agriculture. For medical purposes, conventional microscopes are often too expensive or too bulky to be used in under-served parts of the world. Microscopes can be cost prohibitive for schools or individuals who wish to own one for personal use, and often, microscopes have a fragility that renders them impractical in rugged environments or where many students will be handling them. The size and bulk of conventional microscopes can also render them impractical where a clinician or other user of the microscope is frequently moving between different areas. These problems are addressed by embodiments of the lens structures described herein.

Figure 3:
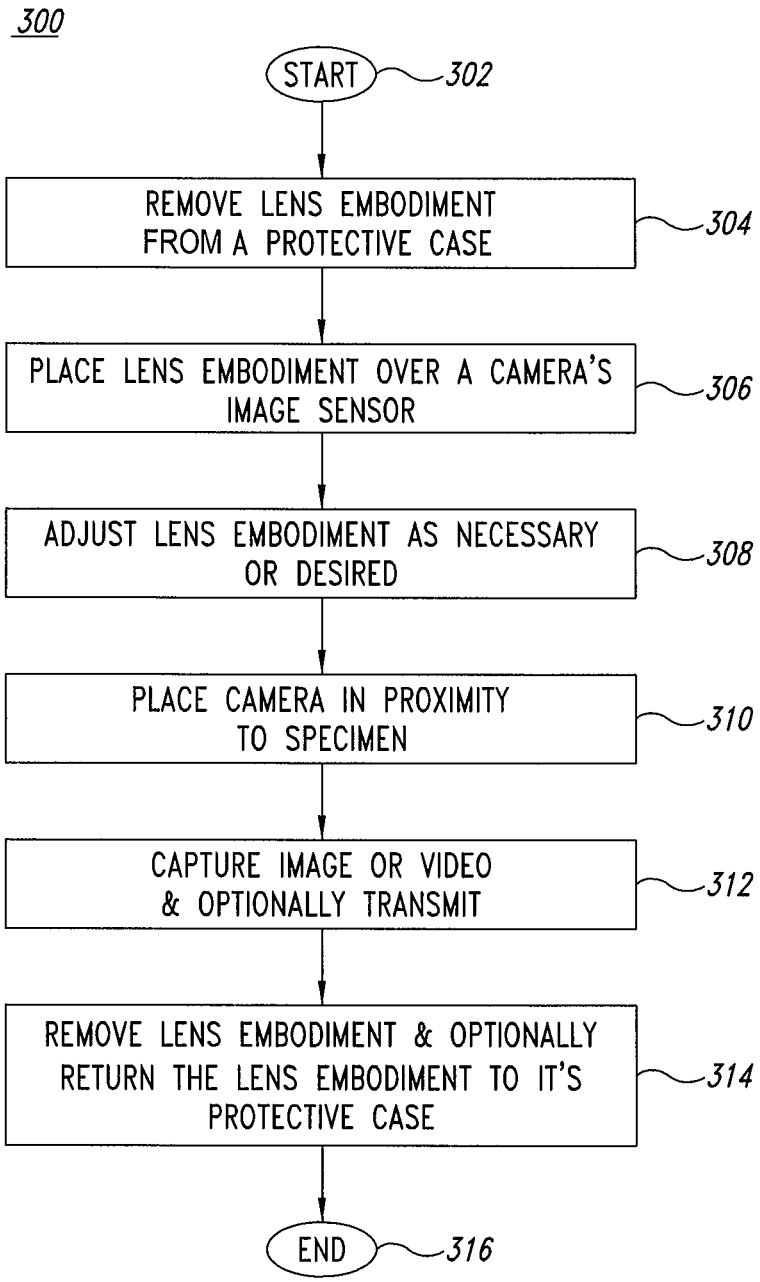
FIG. 3 is a flowchart illustrating one method of using the lens embodiment of FIGS. 2A-2C.

FIG. 3 is a flowchart 300 illustrating one method of using the lens embodiment 100 of FIGS. 2A-2C. The lens structure 100 is simple and uncomplicated to use, and the method begins at 302. In the example, a lens structure 100 is obtained by a user. The lens structure is optionally stored in a container or other apparatus. When the user desires to use the lens structure, the user removes the lens structure from the container at 304. The user places the lens structure in direct contact with a computing device. Generally speaking, the lens structure is placed in contact with the protective cover overlying a camera image sensor of the computing device at 306. The lens structure embodiment is formed as hemispherical lens having a planar surface and a curved surface opposed to the planar surface. In some embodiments, the curved surface has a constant radius. In other embodiments, the curve has a non-linear shape. The planar surface of the lens structure contacts the protective cover, and a convex surface of the lens structure faces away from the computing device.

In some cases, the user can physically manipulate the position of the lens structure to align with the camera (i.e., imaging device) of the computing device at 308. The lens structure can be aligned by lifting and replacing the lens structure, by exerting a lateral force to slide the lens structure, or by some other technique. The user may point the camera at a light source to aid in the alignment of the lens.

After the lens structure is aligned, the user may press against the exposed convex lens surface to ensure the lens structure is secured. The lens structure will be removably and firmly adhered to the surface of the computing device's camera structure.

Once the lens is positioned over the image sensor, the user may then interact with a camera application present on the computing device being used. The user may then align the lens structure with an object of interest, for example, a leaf, an ant, an electronic circuit, or some other specimen at 310. While steadily holding the computing device at a determined distance, such as about 1/8 to 1/4 inch from the object, the user may then take a still image picture of the object or a video of the object using the camera application present on the computing device at 312.

In some cases, the user may transmit the captured image or video via various means available to the computing device.

After the user has completed imaging the object of interest, the user may simply remove the lens structure from the computing device's surface and return lens structure to the storage container at 314. The method ends at 316.

The lens structures described herein can be manufactured by casting PDMS into a mold. PDMS is generally stored in liquid form as a base polymer. Cross linkers are also generally stored in liquid form. These two polymers can be mixed together in a desired ratio, for example around 1:15 cross linker to base polymer in some embodiments. Using a glass stirring rod or another suitable apparatus, the polymers can be vigorously mixed in a disposable container. In some cases, the mixing occurs for about 5 minutes, and in other cases, the mixing occurs for greater or less than 5 minutes.

Optionally, the polymer mixture can be placed in a vacuum chamber for about 60 minutes to remove gas bubbles (e.g., air bubbles) introduced during the mixing process. The time in the vacuum chamber for de-gassing may be increased or decreased to achieve a desired level of homogeneous, bubble-free consistency. Alternatively, other methods to remove bubbles from the polymer mixture can also be used.

The polymer mixture can then be cast into one or more molds to form the lens structure embodiments described herein. The mixture can be poured in an appropriate volume to fill up one or more features of the mold such as cavities. Cavities in a mold can include holes, dimples, depressions, recesses, or the like. Alternatively or in addition, the mold can include protuberances such as bumps, bulges, knobs, protrusions, projections, and the like. The features of the mold are inverse features to those found on one or more formed lens embodiments. In some cases, the mold is arranged to form a single lens embodiment. In other cases, the mold is arranged to form a plurality of lens embodiments.

The polymer mixture can then cure. In some embodiments, the polymer mixture is cured in an oven such as a convection oven. Other ovens can also be used or no oven at all. In one embodiment, curing is performed in a convection oven for about 30 minutes at 100 degrees Celsius (° C.). Generally speaking, curing at lower temperatures can be performed over longer periods of time, and such procedures save energy. Curing at higher temperatures can decrease the amount of time to manufacture lens embodiments. In some cases, temperature can be monitored to reduce the chances that the curing scorches, parches, or otherwise damages the lens embodiments.

Molds as described herein may be made out of a metal, such as aluminum or steel, made out of glass, such as fused silica or sodium borosilicate (i.e., PYREX), or the mold may be cast out of a material like PDMS. Other materials can also be used. A mold will be formed from a material that will maintain its structural consistency to an acceptable level during the time that the polymer mixture occupies the mold and during a range of one or more temperatures the mold is subjected to when lenses are formed. Features of the mold can be polished to an optical quality surface finish. The polishing may be limited to only areas where lens structures will transmit images. Alternatively, the polishing may also include other areas of a lens embodiment such as the wafer area 102 of FIGS. 2A-2C. In other cases, an acceptable mold may be formed without polishing. For example, a mold manufactured with a diamond turning process or another type of process may create a surface finish of sufficient precision that polishing is not performed.

In some cases, the mold is open faced. In other cases, the mold has a cope and a drag. In a multi-part mold, for example when back surface of the mold will oppose a cavity of the mold, the back surface may also be polished to optical quality.

Figure 4:
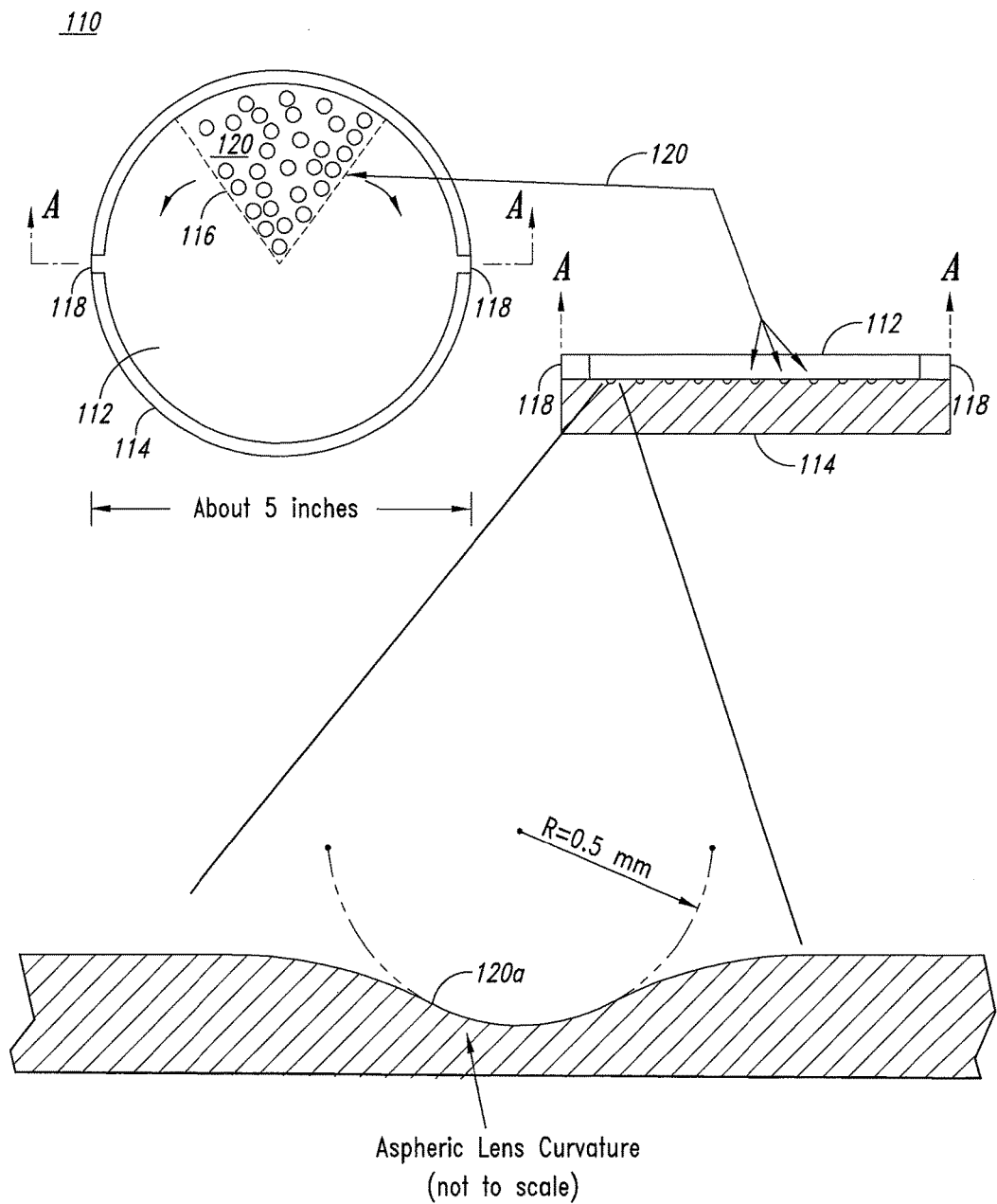
FIG. 4 is an embodiment of a mold arranged to form a plurality of lenses such as the lens embodiment of FIGS. 2A-2C.

FIG. 4 is an embodiment of a mold 110 arranged to form a plurality of lenses such as the lens embodiment 100 of FIGS. 2A-2C. The mold 110 of FIG. 4 is formed of steel and includes two parts; a top portion 112 and a bottom portion 114. In the figure, the top portion 112 is removably joined to the bottom portion 114. A chamber is formed between the bottom portion 114 and the top portion 112, and a polymer mixture will be poured, injected, or otherwise deposited in the chamber during the formation of one or more lenses.

The mold 110 of FIG. 4 is arranged having a generally disc-like shape wherein a top view appears generally as a circle and a cross-section view A-A taken along section line A-A appears generally as a rectangle. Other shapes of the mold 110 are also contemplated. For example, a shape that is generally a square or rectangle may be conducive to separating individual ones of the lenses in an orderly fashion. In such cases, scribe features may also be formed in the mold 110 to guide or otherwise facilitate separation of individual lenses.

A cut-away view 116 of the mold 110 appears as a wedge to simplify illustration of features 120 formed in the bottom portion 114 of the mold 110. The features 120 are typically, though not always, formed over a substantial portion of the inner surface of the bottom portion 114. Also illustrated in the mold 110 are vents 118. The vents 118 facilitate release of gasses and extra material from the mold 110 as lens embodiments are formed. The features 116 and vents 118 of the mold 110 are illustrated in both the top view and cross-section view.

An exploded view of one feature is taken from the cross-section view in FIG. 4. The exploded view illustrated provides a close-up view of one feature 120a of the plurality of features 120 formed in the bottom portion 114 of the mold 110. The feature 120 is illustrated with an aspheric lens curvature, but other lens surface properties could also be formed. The aspheric lens curvature is formed with a radius of about 0.5 millimeters (mm), though other features sizes and dimensions are also possible.

In the embodiment of the mold 110 of FIG. 4, the mold 110 has a diameter of about five (5) inches. Such a size facilitates reasonable handling of the mold 110 before, during, and after the formation of lens embodiments. Other sizes of molds, both larger and smaller, are also envisioned. The size of the mold may be based on yield size, manual versus automatic processes of lens formation, and for other reasons.

Figure 5:
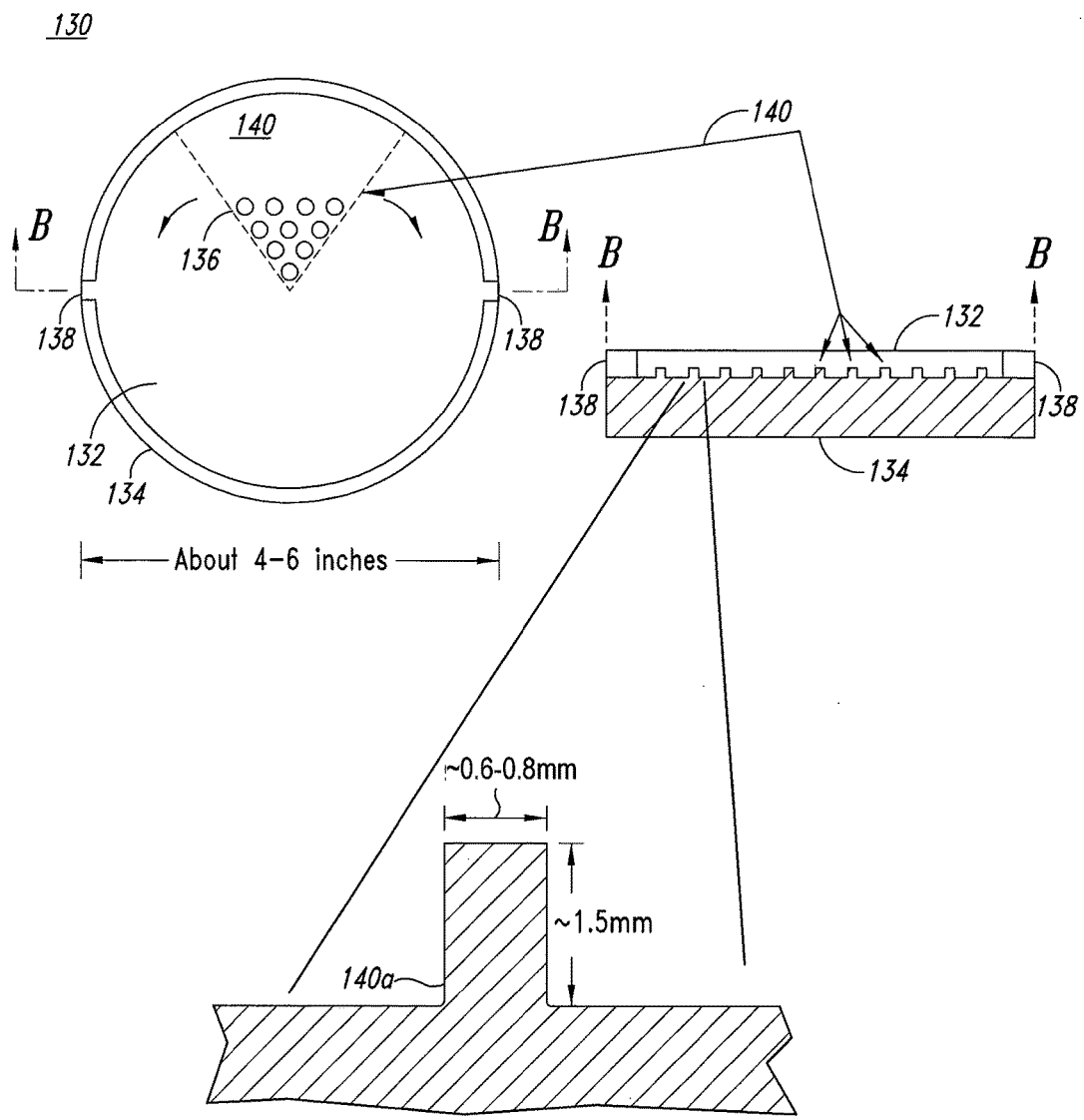
FIG. 5 is another embodiment of a mold arranged to form a plurality of lenses.

FIG. 5 is another embodiment of a mold 130 arranged to form a plurality of lenses. The mold 130 of FIG. 5 bears similar structures and arrangements to the mold 110 of FIG. 4. Although the mold 130 is shown having a rough diameter of four (4) to six (6) inches, other sizes as discussed herein are envisaged. The mold 130 of FIG. 5 has two parts; a top portion 132 and a bottom portion 134. The top portion 132 is removably joined to the bottom portion 134, and a chamber is formed between the bottom portion 134 and the top portion 132. In the molds described herein, the top portion and bottom portion 132, 134 may be interlocked together, screwed, latched, clamped, or joined in any other way. During the formation of lenses, a polymer mixture is directed into the chamber region between the top portion 132 and bottom portion 134 of the mold 130.

Similar to mold 110 of FIG. 4, the mold 130 of FIG. 5 is arranged having a generally disc-like shape, which is generally efficient, but molds of other shapes may be chosen. The mold 130 is illustrated as having a diameter of 4 to 6 inches, and larger and smaller sizes are considered as well. A cross-section view taken along section line B-B appears generally as a rectangle.

The cut-away view 136 of the mold 130, which appears as a wedge to simplify the illustration, reveals a set of features 140 formed in the bottom portion 134 of the mold 130. The features 140 are formed over a substantial portion of the inner surface of the bottom portion 134, but this need not be the case. The features 140 can be formed in any suitable arrangement within the mold 140. The features 140 of FIG. 5 are shown having a substantially cylindrical shape, but other shapes such as square posts, rectangular posts, and others are also possible. In one embodiment, there are 50 to 100 features (e.g., cylindrical posts) 140 arranged on the bottom portion 134 of the mode.

In the embodiment of FIG. 5 or in other embodiments, the mold 130 includes features 140 having the same number, position, and arrangement as features 120 (e.g., aspheric lens cavities) formed in mold 110. That is, for each aspheric lens cavity 120a of FIG. 4, the mold 130 of FIG. 5 includes a corresponding cylindrical post 140a. Such optional arrangements can facilitate the efficient construction of molds, lens embodiments having similar sizes and wafer structures, and other beneficial results. In the alternative, or in addition, portions of one mold can be used interchangeably with another mold. For example, the top portion 112 (FIG. 4) may be the same as the top portion 132 (FIG. 5). Both top portions may be formed with a very smooth, planar surface, which will facilitate the formation of lenses having high light transmission properties.

Another benefit of forming mold 110 (FIG. 4) and mold 130 (FIG. 5) in a way that the two molds have corresponding features is that such an arrangement permits the formation of integrated, multi-part lens structures. For example, in some embodiments, the mold 130 of FIG. 5 includes a plurality of substantially cylindrical post features 140. The mold of FIG. 4 includes a plurality of lens curvature features 120. Generally speaking, within the molds, each one of the cylindrical post features 140 will correspond to one of the lens curvature features 120.

Speaking broadly of one embodiment, a cylindrical post 140a can be used to form an aperture out of opaque PDMS. PDMS, with an opaquifier mixed in, can be cast in mold 130. After curing, the result is an opaque, solid disc of PDMS having holes caused by each cylindrical post in the mold. The solid disc of PDMS is transferred to mold 110, where each hole corresponds to a lens cavity 120a. When transparent PDMS is then cast in mold 110 and cured, a single piece of polymer having distinct opaque and transparent portions bonded together is formed. This process may involve a 2 step procedure, as described below, or may involve many steps to create complex polymer structures.

In one act, a first polymer mixture is deposited in the mold 130, and the first mixture is appropriately processed. The resulting product, when it is removed from the mold 130, is a "sheet" of first polymer material. The sheet of first polymer material includes a plurality of holes formed as the first polymer material filled the space up to and around the cylindrical post features 140. After the sheet of first polymer material with the holes is removed from mold 130, the sheet can be placed into a corresponding mold 110 having a corresponding arrangement of features 120. Each "hole" in the sheet of first polymer material is generally aligned above a feature 120 (e.g., an aspheric lens curvature). In another act, a second polymer material is deposited in mold 110. Some of the second polymer material passes through the holes in the sheet and fills the features 120, and some of second polymer material flows over the sheet of first polymer material. After appropriate processing of the second polymer material, an integrated, multi-part (i.e., two-part) lens structure is produced. The second polymer material forms lenses that pass through the holes (i.e., aperture) formed from the first polymer material.

The two-part process described using mold 130 (FIG. 5) and mold 110 (FIG. 4) is one of many possible processes. Additional layers with the same or different polymer materials can also be formed. In one case, a light restrictive material (i.e., an opacifier) is used as the first polymer. A light transmissive material is used as the second polymer. In the process, the second polymer cures into a substantially clear lens that is integrated with the light restrictive ring of first material (e.g., FIGS. 8A-8D). In a second case, the first polymer material will cure into a more rigid structure then the second polymer material. In this case, the integrated, multipart lens will have a structurally strong body and a soft, flexible optical lens. Two or more materials having different properties may also be used.

Vents 138 facilitate the release of gasses and extra material from the mold 130 during the formation of lens embodiments.

In the exploded view of FIG. 5, one cylindrical post feature is taken from the cross-section view in FIG. 5. The exploded view shows a cylindrical post 140a up close. The cylindrical post 140a is illustrated having a diameter of about 0.6 mm to 0.8 mm and a height of about 1.5 mm, but other dimensions are possible. Also illustrated in the exploded view of FIG. 5 is a cylindrical post having a very sharp profile. The sharp profile may be formed by detailed machining techniques with which the mold 130 is formed, by post-processing an already formed mold 130, or by some other technique.

As described herein, some embodiments of the lens structure are formed as a small disk or wafer having a convex lens protruding from one face (see, for example, FIGS. 2A-2C). Embodiments may or may not include additional features. One optional feature included in some embodiments is a riser or set of risers that protrude from the disk face in or near the lens portion.

Another optional feature included in some embodiments is the addition of an aperture formed by an opaque layer of material. Embodiments of the lens structure may use additives to the polymer such as opacifiers or dyes to block out light so that it does not pass through the lens structure. This can be used to form an aperture of a desired width (i.e., diameter), which can influence the depth of field, feature resolution, and brightness of the image. Some embodiments may include other additives to act as filters, polarizers, or to perform other functions. These include but are not limited to fluorescent filters, Rheinberg filters, or other filters that modify the qualities of electromagnetic radiation.

Lens structure embodiments may be removably (i.e., non-permanently) placed directly on the glass or plastic panel covering the camera image sensor of most computing devices. When placed, the convex lens of certain lens structure embodiments faces outward. The lens structure self-adheres to the camera and remains in place until removed by the user. Due to self-adherent properties, embodiments of the lens structure do not require additional chemical or mechanical fasteners. Should the planar or other surface of lens structure become dirty, dusty, or otherwise contaminated, the lens structure may be washed with soap and water and will regain substantially all of its previous functionality. That is, even though the lens structure does not require any applied adhesives, the clean lens structure will adhere to a flat piece of glass, plastic, and the like because of the properties of such a properly formed PDMS lens structure.

The self-adherent property of the lens structure may be attributed to a tailored mixture of polymers involved in manufacturing. The tailored mixture allows the lens structure to be placed directly on a glass, plastic, or other material of an outside component of an electronic device camera, and the lens structure will stick until removed by a user. In one embodiment, a blend of 1:9 cross linker to PDMS by mass is used for many MEMS and microfluidics applications. A 1:9 blend improves the potential bonding between polymers. By mixing in less cross linker, it is possible to change the material properties of the cured PDMS. Having polymer chains that aren't completely bonded makes the cured PDMS "stickier." For example, using a blend of 1:15 cross linker to base PDMS by mass produces, when cured, an elastomer that will readily adhere to many flat surfaces including glass or plastics. This adhesion is attributed to Van der Waals forces present between the PDMS and the surface to be adhered to. If the outside of the wafer and lens structure becomes dirty, the lens structure may simply be washed clean.

In certain embodiments described herein, the lens structure is a low-cost self-adhering soft polymer chip with a lens that modifies the optical properties of the camera of a consumer electronic computing device. The lens structure allows the camera of most computing devices to function as a microscope having a power determined by the specific dimensions of the lens structure. Utilized by a placement directly above the camera image sensor of the computing device, the lens structure embodiment allows functionality as a microscope with cooperation of whatever camera application is present on the computing device. In some embodiments, a larger radius of curvature of the lens allows the lens structure to work as a macro lens. Additional curvatures may allow other optical effects.

In one form the lens structure has a flat disk or wafer about 6 millimeters (mm) in diameter and approximately 1 mm in thickness. The wafer may be circular, rectangular, or another geometry. This is just one example of dimensions of the wafer that have been found to work well. Protruding from one face of the disk is a convex lens. The convex lens may have a curvature that is spherical, aspherical, parabolic, or some other geometry. The radius of curvature of the lens is one factor that determines the magnification of the microscope system. A larger radius of curvature generally results in a lower level of magnification. In one embodiment arranged for a microscope system with magnification of approximately 15× on a cell phone screen, the convex lens has a radius of curvature of 3.175 mm and protrudes 0.75 mm from the flat surface of the disk. In another embodiment, a microscope system with a magnification of a phone screen of approximately 125× and feature resolution of 1.5 microns can be formed with a convex lens having approximate dimensions of 0.5 mm radius of curvature and protruding 0.25 mm from the outside surface of the wafer. The entirety of the lens structure embodiment can be formed as a single piece of solid PDMS.

The lens structure embodiment having a circular wafer with a diameter of about 6 mm has several advantages. This geometry fits well within the metal washer bezel surrounding the outer glass or plastic cover of many camera imaging devices integrated in conventional computing devices. An embodiment having such geometry facilitates easy and trivial alignment and placement of the lens structure. Another advantage of such an embodiment is that the circular shape reduces the quantity of material needed to produce a functional lens structure.

The thickness of the wafer or disk is another factor that affects the optical functionality of the lens structure. For example, to increase utilization of the available screen space of a typical computing device (e.g., a cell phone), a disk of 1 mm thickness has been found to work well. Increasing the thickness of the wafer will decrease the size of the field of view as it appears on the device screen. Larger screens or smaller screens may be accommodated with a wafer or disk of a different thickness. In some cases, a user may have set of disks, each having different geometries and thus, each having different optical properties. In such a set, a user may by trial and error determine a lens structure most appropriate for the desired imaging.

By changing the radius of curvature and protrusion of the lens component, as well as the thickness of the wafer, it is possible to achieve a wide variety of magnifications. For example, in one embodiment, a lens with radius of curvature of 0.5 mm, protruding 0.25 mm from a wafer 0.75 mm thick, produced a magnification of approximately 125× on a computing device (e.g., a cell phone) screen.

A larger radius of curvature may allow a lens structure embodiment to function as a macro lens. The curvature of the convex lens may be spherical, aspheric, parabolic, or another configuration. The nature of the curvature may depend on the intended use of the lens structure. The nature of the curvature may in addition or as an alternative depend on manufacturing considerations. For example, a spherical lens may be easier to manufacture than other lens types, and an aspheric lens may provide a better image quality.

Using a spherical lens may result in some spherical aberration, especially at higher magnifications. This means that the center of the field of view will be clear, while the off-center field of view moving radially outward from the center will result in radial distortion. This effect is not as noticeable at lower magnifications, and this effect can be mitigated by adjusting the numerical aperture of the lens. One way to adjust the numerical aperture of the lens is to modify the distance that the lens protrudes from the base wafer.

With low magnification lenses, the computing device's camera may be pointed directly at the specimen to be viewed. Once the lens structure has been placed and aligned on the camera, the lens structure is ready to be used. The computing device's camera can preferably be pointed directly at the specimen. In some embodiments, for example, using the lens structure 100 of FIGS. 2A-2C, the specimen should be approximately 1/8th to 1/4th inch from the lens structure of the device. The user can then slowly adjust the distance of the camera forward or backward (i.e., closer or farther) from the specimen until the specimen enters the focal plane of the lens and the image becomes clear. Holding the device steady, the user may then capture an image or video of the subject on a microscopic scale. Some devices include a "tap to focus" option or related features in the device's camera application, which can be operated to increase the ease of use of the computing device and lens structure system.

Figure 6A:
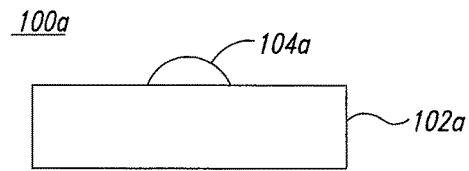
FIGS. 6A-6F illustrate several other non-limiting lens structure embodiments.
Figure 6B:
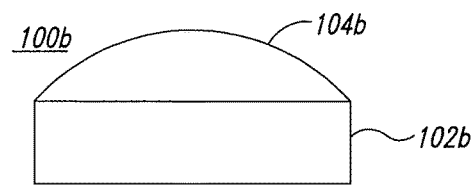
Figure 6C:
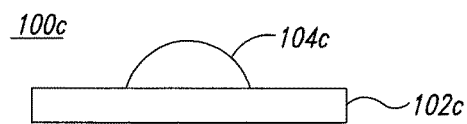
Figure 6D:
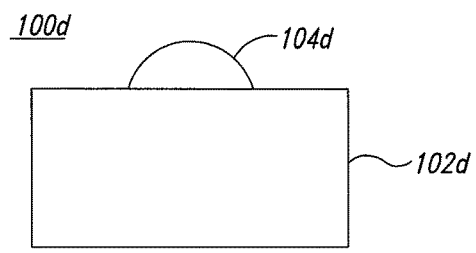
Figure 6E:
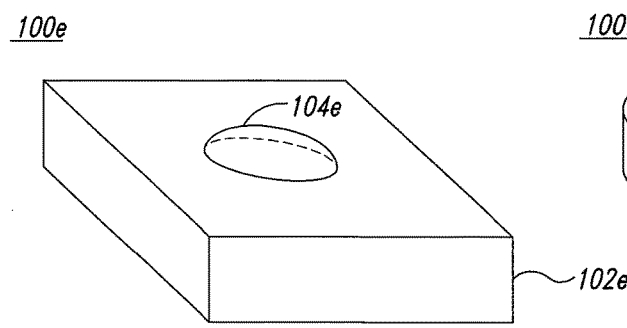
Figure 6F:
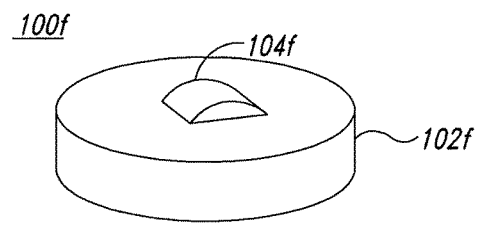

FIGS. 6A-6F illustrate several other non-limiting lens structure embodiments. The lens structures shown are not exhaustive. That is, many other shapes, sizes, geometries, and other features can be employed individually or in combination to create lens structures. In FIG. 6A, a lens structure 100a includes wafer structure 102a, which is formed with a small lens 104a. In FIG. 6B, a lens structure 100b includes a wafer structure 102b formed with a large lens 104b. In FIG. 6C, a thin wafer structure 102c is formed with a lens 104c in lens structure 100c, and in FIG. 6D, a thick wafer structure 102d is formed with a lens 104d in a lens structure 100d. FIG. 6E illustrates one embodiment of a lens structure 100e having a square wafer structure 102e and a lens 104e. When formed in a mold, certain scribe features (not shown) may also be formed in the surface of the mold. The scribe features are formed in between individual lens structures 100e of the plurality of lens structures formed in the mold. The scribe lines facilitate separation of individual lens structures 100e of the type illustrated in FIG. 6E. In FIG. 6F, a lens structure 100f includes a wafer structure 102f having a non-convex lens 104f. The non-convex lens can be a concave lens or a lens with different geometric properties.

At different, (e.g., higher) levels of magnification, the specimen, such as a sample on a glass microscope slide, may be placed directly on the outside surface of the wafer. In such cases, it has been discovered that certain features may be formed in a lens structure to assist a user in focusing and in addition or in the alternative aligning the camera of the computing device. The features to focus or align the specimen in proximity to the camera's image sensor may be fixed structures or flexible structures. The flexible structures, for example, can be used to provide a variable focus or variable alignment features to the lens structure.

Figure 7A:
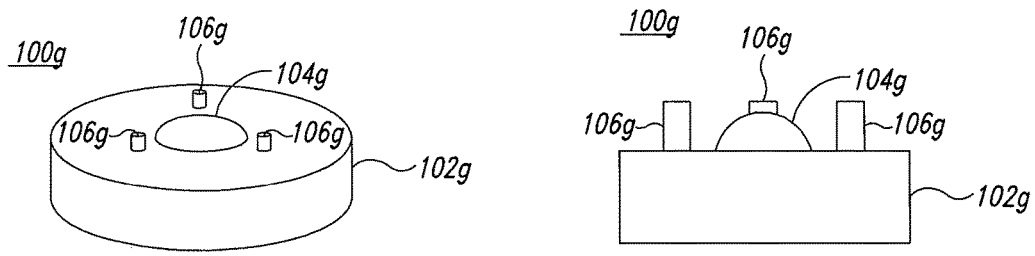
FIGS. 7A-7C illustrate lens structures having certain protrusion features.
Figure 7B:
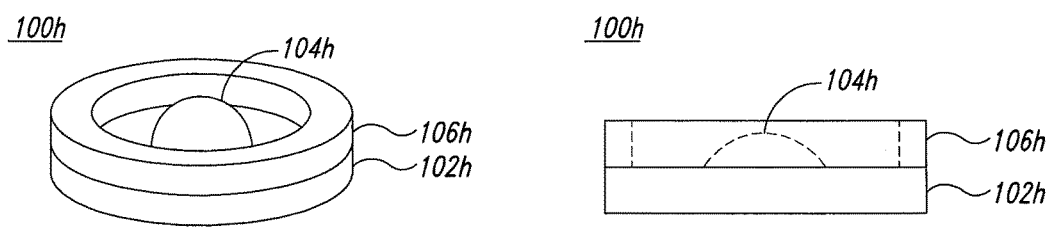
Figure 7C:
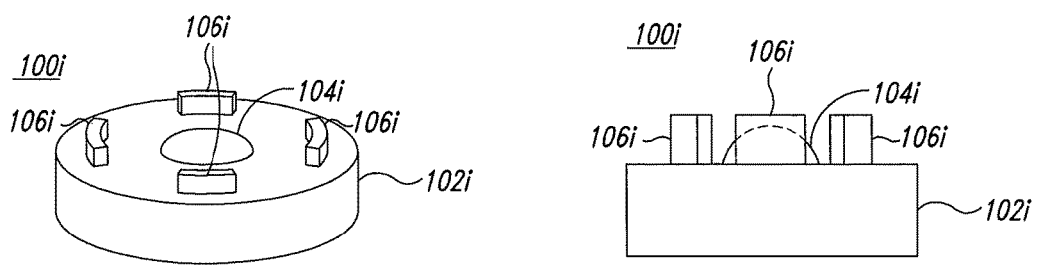

FIGS. 7A-7C illustrate lens structures having certain protrusion features. The lens structures of FIGS. 7A-7C are not limiting, but instead illustrate different protrusion features that can be employed and other types of protrusions can also be formed or otherwise integrated with a lens structure.

In FIG. 7A, a perspective view of a lens structure 100g and a side view of the lens structure 100g are shown. In the embodiment, three (3) generally cylindrical posts 106g are formed and integrated with the wafer structure 102g. The cylindrical posts 106g generally extend higher than the surface of the lens 104g, but this is not required. Three cylindrical posts 106g are illustrated by more or fewer posts are possible. In addition, the posts can be cylindrical, square, or formed with another profile, the posts can have any particular diameter, width, or other dimension, and the posts can be formed from the same as or a different material from the wafer structure 102g. In one embodiment, for example, the posts are 1-3 mm in diameter. Generally speaking, thicker posts provide more resistance to compressive forces, thereby offering improved control of the focusing and alignment characteristics. The cross-sectional area of the posts or feet can be selected to provide a desired relationship between force and displacement.

FIG. 7B shows perspective and side views of a lens structure 100h. In the embodiment, a protrusion ring 106h feature is formed. The protrusion ring 106h may be formed separate from a wafer structure 102h and in other cases, the protrusion ring 106h is formed with or contemporaneously with the wafer structure 102h. The protrusion ring 106h may have any suitable diameter, height, and width. Control of the material to form the protrusion ring 106h and the geometry of the protrusion ring 106h will generally determine how flexible and thereby controlling the ring will be.

FIG. 7C illustrates a lens structure 100i having a wafer structure 102i with a truncated ring 106i feature. Each portion of the truncated ring 106i may be a separate and distinct "foot" or "stand-off." The truncated ring may be formed with four (4) or a different number of feet. Alternatively, the truncated ring may be formed as a ring (e.g., protrusion ring 106h) and then processed to remove certain sections of the ring. The materials and geometry of the truncated ring 106i, similar to other protrusion features, will often determine how resistive the lens structure 100i is to compressive force and lateral, repositioning forces.

With included protrusions as described herein, the user may hold the slide against the surface of the lens structure. By applying pressure to the slide, the user deforms the protrusions and brings the slide closer to the lens. In this way the user may apply a variable amount of pressure to bring the sample into focus on their computing device. With high power microscopy (e.g., 50× or above on a typical computing device (e.g., cell phone) screen), an external backlighting source is often required. This light source may be an LED, a light bulb, a flashlight, the sun, or something else. The computing device in such cases is oriented so that the camera is pointing directly at the light source. In this way the light source provides back lighting for the specimen present on the microscope slide or other medium. In some cases, a user may add microscope oil or some other medium to increase the resolution of the device image.

Additional features may be included to facilitate microscopy at higher levels of magnification. Some examples include, but are not limited to, the use of deformable protrusions as well as the use of opacifiers.

In many cases, it is possible to increase the ease at which the microscope can be focused on a specimen through the use of protrusions that extend from the outward face of the wafer past the height of the lens. The form of these protrusions can include but are not limited to pillars with round or square cross sections, an extruded ring concentric with the center lens, or some other like feature. These protrusions provide a platform that a microscope slide can be manually held against. By exerting a force against the microscope slide, the protrusions may be deformed, thus bringing the microscope slide or alternate specimen of interest closer to the body of the wafer. The deformation provides a means of focusing the microscope device by applying a variable force to the microscope slide. Force can be applied to deform the protrusions until the desired feature is brought into the focal plane of the lens. Additionally, this deformation of the protrusions, depending on geometry, may to a lesser extent deform the curvature of the lens such that the focal plane may be adjusted to a more desirable position.

With higher power microscopy, the addition of opacifiers (i.e., dyes or other light restrictive materials) such as aluminum dioxide, tin dioxide, chromium oxide, iron oxide, titanium dioxide, ultramarine, or other materials can be used to improve image quality. In some embodiments, the opacifier material is mixed with liquid PDMS in a separate and distinct act from the formation of the lens structure. In other embodiments, the opacifier material act is integrated with the formation of the lens structure. The opacifier material is generally shaped as a washer (e.g., a disc or donut) when the lens has a circular shape, but the opacifier material can also take another suitable shape or other geometry as appropriate. When formed separately, the opacifier material can then be combined with the wafer and lens.

The opacifier component portion operates to reduce or block out undesirable light from hitting the camera sensor; the undesirable light being light that does not pass through the lens. The opaque section delineates an aperture for controlling the amount of light passing through the lens. This may be used to influence the effective numerical aperture of the system. In this way, the opaque section can improve image quality. An opacifier component can be used in conjunction with and can include or be molded separately from shelf protrusions to improve the use of higher power lenses. Even in embodiments, where the opacifier component portion is manufactured in a multi-step molding, lens structure embodiments containing an opaque section as described herein may remain a monolithic piece of elastomer.

In some cases, the opacifier material is formed as a frustum or other shape. In such cases, compression of the opacifier material can change the size of the aperture making the opening larger or smaller. Other shapes, diameters, thicknesses and the like can be formed to create a variable aperture lens structure.

Figure 8A:
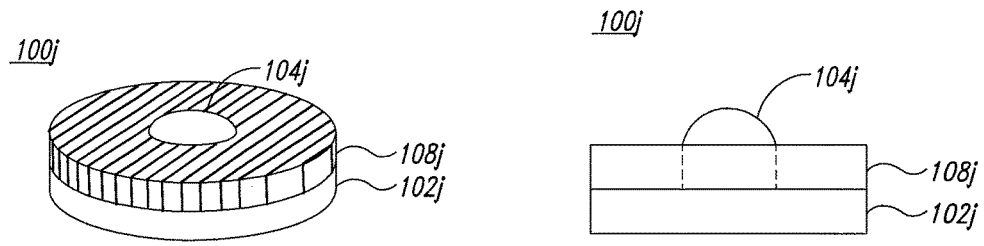
FIGS. 8A-8D illustrate lens structures having certain opacity features.

FIGS. 8A-8D illustrate lens structures having certain opacity features. In FIG. 8A, a lens structure 100*j* is shown in perspective and side views. The lens structure 100*j* includes a lens 104*j* and a wafer structure 102*j*. An opacity feature 108*j* is integrated with the lens structure 100*j*. The opacity feature 108*j* includes an aperture 109*j*, which permits light to pass through the lens structure 100*j* below the lens 104*j*. Light that strikes the lens structure 100*j* in an area outside of the lens 104*j* perimeter is restricted or blocked. In the embodiment of FIG. 8A, the opacity feature 108*j* is formed between the lens 104*j* and the wafer structure 102*j*, but a different layering may also be suitable. In some cases, the opacity feature 108*j* is formed as a separate and distinct process. Alternatively, the formation of the opacity feature 108*j* can be integrated with other acts of the formation of the lens structure 100*j*.

Figure 8B:
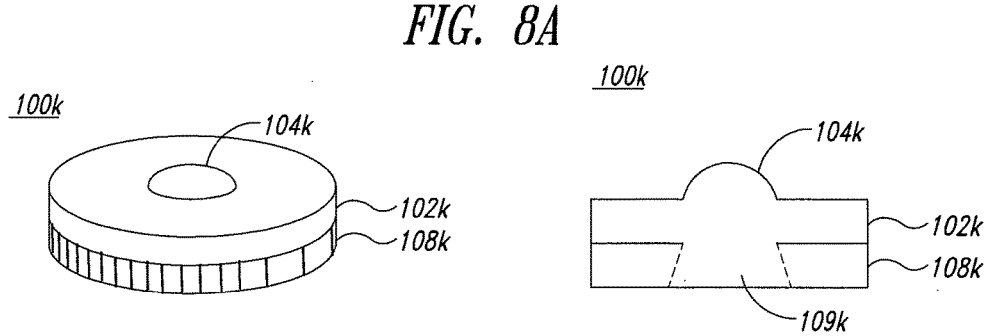

The embodiment of FIG. 8B is similar to the embodiment of FIG. 8A in some respects. The embodiment of FIG. 8B illustrates a lens structure 100*k* having a lens 104*k*, a wafer structure 102*k*, an opacity feature 108*k*, and an aperture 109*k*. It is recognized that the order of layers in lens structure 100*k* is different from that of lens structure 100*j* (FIG. 8A). Other embodiments may have the same or different ordering of layers.

In the embodiment of FIG. 8B, the opacity feature 108*k* includes an aperture 109*k* having a variable diameter. In the embodiment, the aperture is illustrated having a larger diameter distal to the lens 104*k* and a narrower diameter proximal to the lens 104*k*. Other embodiments may have the same arrangement, an opposite arrangement, or a different arrangement. In the embodiment of FIG. 8B, increasing a compressive force to the lens structure 100*k* will change the diameter of the aperture 109*k*.

Figure 8C:
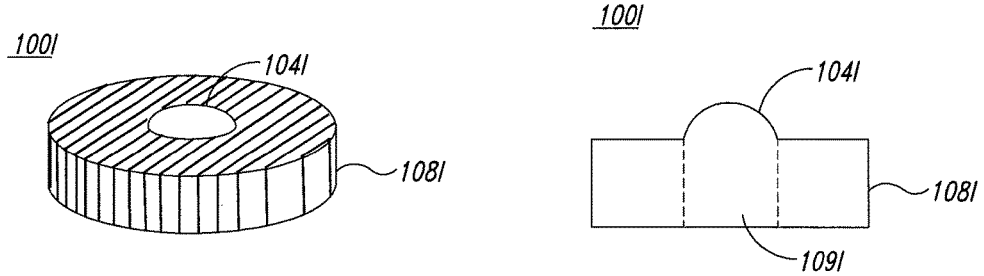
Figure 8D:
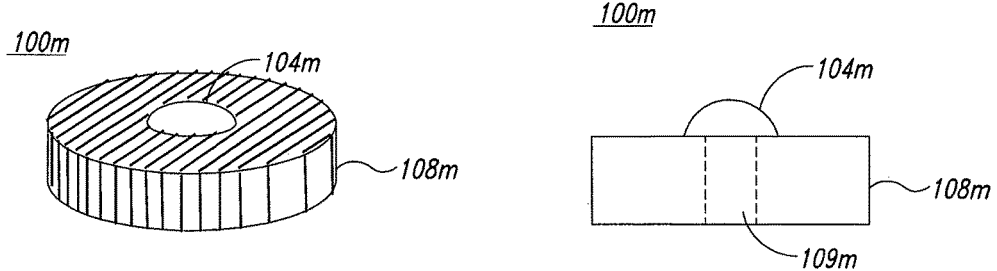

The embodiments of lens structures 100*l* and 100*m* in FIGS. 8C and 8D, respectively, share several features. The lens structure 100*l* includes a lens 104*l* formed above or as part of an opacity feature 108*l*, and the lens structure 100*m* includes a lens 104*m* formed above or as part of an opacity feature 108*m*. The lenses 104*l* and 104*m* share similar properties and the opacity features 108*l* and 108*m* share similar properties. In the embodiments, the aperture 109*l* is narrower than the aperture 109*m*. Such features may be employed to direct or otherwise control light that is permitted to pass through the respective lenses 104*l*, 104*m*.

One reason for using an elastomer like PDMS is its favorable optical properties. PDMS has an index of refraction of 1.4, similar to many types of glass. This index of refraction makes PDMS a good candidate when selecting a material for a lens, and when other mechanical properties are also desired. Elastomers such as PDMS are generally easy to mold, and they are resistant to scratching, cracking, and other forms of damage.

Some chemicals referred to herein are composed of materials presented in Table 1.

TABLE 1

Materials used in lens structure embodiments

| Base PDMS: | Dimethyl siloxane, dimethylvinyl-terminated, Dimethylvinylated and trimethylated silica, Tetra(trimethylsiloxy) silane, Ethylbenzene |
| Cross Linker (or curing agent): | Dimethyl, methylhydrogen siloxane, Dimethyl siloxane, dimethylvinyl-terminated, Dimethylvinylated and trimethylated silica, and Tetramethyl tetravinyl cyclotetrasiloxane |

In some embodiments, PDMS is an organosilicon polymer that is synthesized from dimethylsiloxane oligomers with vinyl-terminated end groups, dimethylvinylated and trimethylated silica filler, a platinum catalyst, a cross-linking agent, dimethylmethylhydrogen siloxane, and an inhibitor, tetramethyltetravinyl cyclotetrasiloxane.

In embodiments of the lens structures described herein, individual features or combinations of features may include those recited in Table 2.

TABLE 2

Structures used with lens structure embodiments

Sticking the lens structures on a computing device favorably changes the computing device's its optical functionality.

TABLE 2-continued

Structures used with lens structure embodiments

Embodiments of the lens structures work with computing devices such as cell phones, tablets, mp3 players, laptops, and more.
Embodiments of the lens structures are comprised of a monolithic chunk of polymer (PDMS).
Embodiments of the lens structures are self-adhering through specific tailoring of the polymer (non-permanent).
Embodiments of the lens structures include a single lens.
Embodiments of the lens structures include a plurality of lenses formed on a single substrate.
Embodiments of the lens structures allow the computing device to function as a microscope.
The optical power of the microscope system produced with embodiments of the lens structures may correspond to the specific dimensions of the lens structures.
Embodiments of the lens structures can function as a macro lens to 150X or more.
Additional morphology in some embodiments may improve functionality at higher powers:

"risers" or "shelves" located around the lens itself allow a platform for a microscope slide to be placed.
Risers may allow easier focusing of the viewed subject.
Applying pressure deforms the risers, which changes the curvature of the lens such that the focal point of the lens is moved outward or in another direction.
The device can be accurately focused by applying pressure to the microscope slide.
Alternatively, the slide can be placed directly on the lens. Applying pressure to the lens deforms the lens and brings the focal point closer to the lens. In this way pressure can be used to focus the device on the sample.
Opacifiers mixed with the polymer can be used to block out light that does not pass through the lens, thereby improving image quality.
Opaque sections formed by opacifiers may form an aperture, modifying the numerical aperture.
The size of the aperture may be variable based on the shape and quantity of opacifier material used.
Embodiments of the lens structures may combined with additional devices to produce new and useful systems:

Embodiments of the lens structures can be used with a "bench" or "platform" that the computing device (e.g., cell phone) is set on.
The platform may include adjustable pegs to fit to most computing devices.
The platform may include a sample tray with adjustable position such that the distance from the sample to the cell phone camera can be modified for desirable focusing.
The platform may include an adjustable diffused light source to improve the image quality of the device.

The lens structures discussed herein may be coupled to computing devices, and when so-coupled, the combination may perform functions of a microscope. Magnified images of a specimen are captured through the lens structure via an image sensor of the computing device.

Figure 9A:
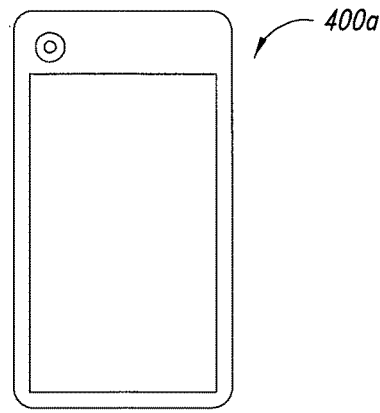
Figure 9B:
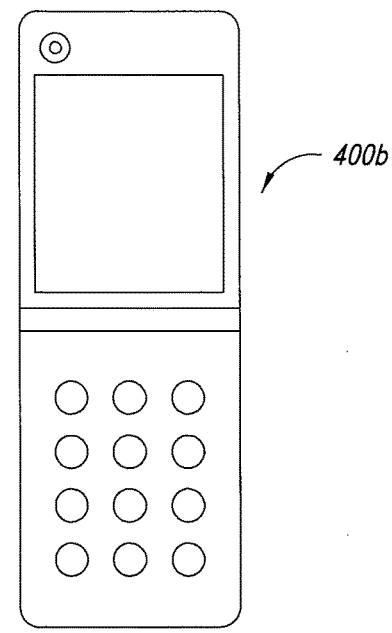
Figure 9C:
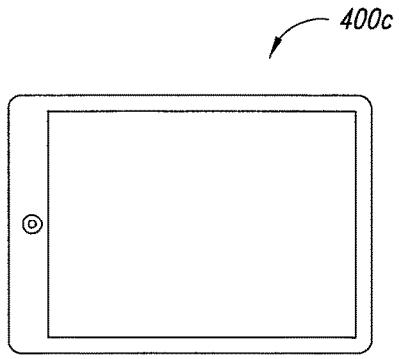
Figure 9D:
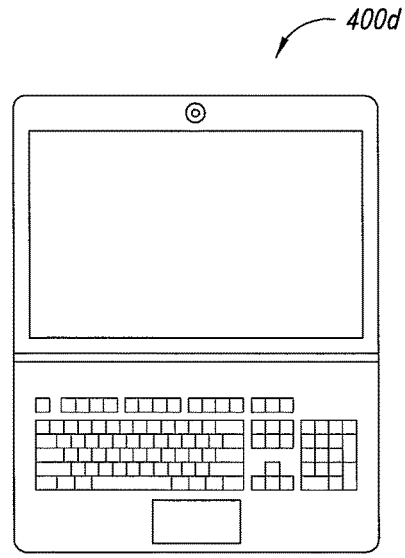
Figure 10A:
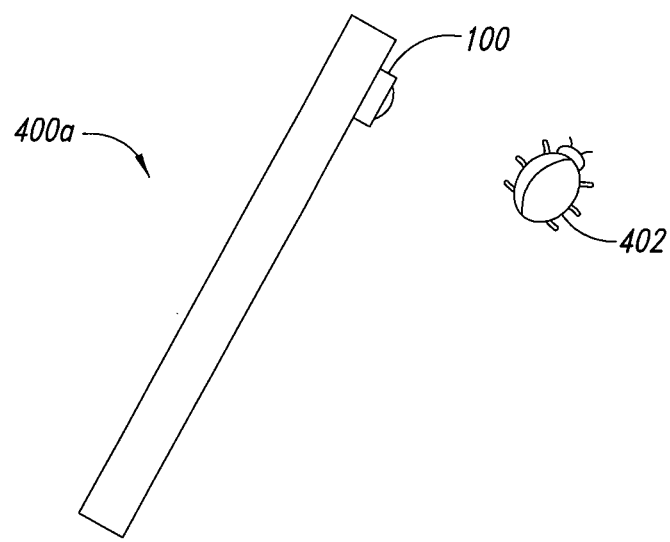
FIGS. 10A-10B illustrate a method of use of a lens structure coupled to a computing device.
Figure 10B:
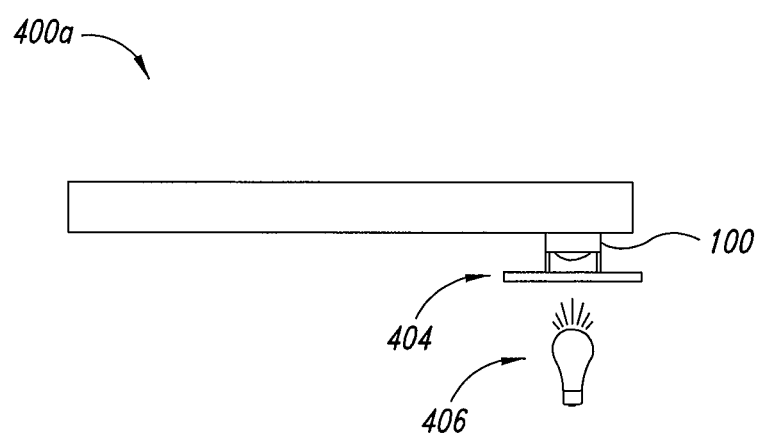

FIGS. 9A-9D illustrate non-limiting embodiments of computing devices that a lens structure may be coupled to. In FIG. 9A, a smartphone 400a is shown. Generally speaking, a smartphone is a mobile communication device that includes several additional features such as one or more liquid crystal display (LCD) screens or other similar displays, communication applications such as electronic mail (email), an image sensor and cooperative camera application for still image and video capture, and other features. FIG. 9B illustrates a "flip-phone" style mobile communication device 400b, which also includes an image sensor and cooperative camera application. FIG. 9C illustrates a tablet computing device 400c, and FIG. 9D illustrates a laptop computing device 400d. The computing devices of FIGS. 9A-9D may each have different means for capturing images and video, however, one common feature is that each respective device includes image capture and, in addition or in the alternative, video capture capability. FIGS. 10A-10B illustrate a method of use of a lens structure coupled to a computing device. In FIGS. 10A-10B, a smartphone computing device 400a is shown, but any other computing device having an image sensor, such as those shown FIGS. 9A-9D, but not limited to the computing devices of FIGS. 9A-9D, may be used.

The smartphone 400a in FIGS. 10A-10B has a lens structure 100 coupled over an image sensor. The lens structure 100 may be of the type illustrated in any of the figures herein and referenced as lens structure 100a-100m. Alternatively, the lens structure 100 of FIGS. 10A-10B may be a different embodiment not otherwise illustrated by nevertheless having properties taught by the present disclosure.

In FIG. 10A, an insect specimen 402 is within proximity of the lens structure 100. The lens structure 100 may magnify a portion of the insect specimen 402 by 25×, 100×, 150× or by some other magnification reference value. An image sensor is directed by the smartphone 400a to capture still or video images of the magnified image that is incident on the image sensor of the smartphone 400.

In FIG. 10B, the smartphone 400a has a different type of lens structure 100 attached. The lens structure 100 in FIG. 10B includes a protruding focusing/alignment feature, which may be of the type illustrated in FIGS. 7A-7C or of some other type. A specimen can be placed on a microscope slide 404, or in some cases between two microscope slides 404, and the microscope slide arrangement can be placed in contact with the protrusion feature of the lens structure 100. An optional light source 406 may provide back-light as the specimen is imaged.

Figure 11A:
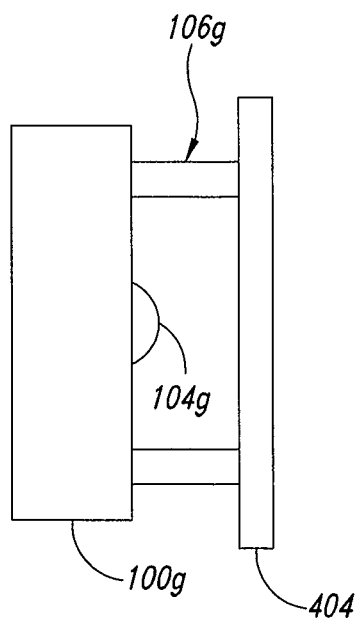
FIGS. 11A-11B illustrate a variable focus/alignment feature.
Figure 11B:
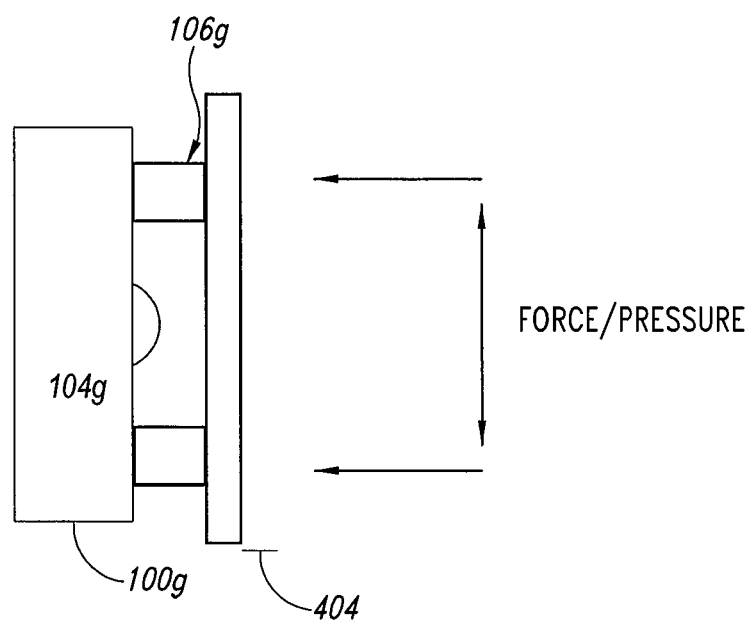

FIGS. 11A-11B illustrate close up views of a lens structure 100g, which has a lens 104g and protrusion features 106g. A microscope slide arrangement 404 having a specimen thereon is placed in contact with the protrusion features 106g. In FIG. 11A, no opposing pressure is applied between the lens structure 100g and the microscope slide 404. In FIG. 11B, both compressive force and lateral force is applied to one or both of the microscope slide arrangement 404 and the smartphone 404a. The lateral force may be applied to desirably align or otherwise position the specimen above the image sensor. The compressive force may be applied to compress the protrusion feature 106g and thereby change the optical properties of the lens 104g. For example, compressing the protrusion features 106g may alter the optical properties to provide better clarity of the image focused on the image sensor or a different magnification. It is apparent in FIG. 11B that the protrusion features 106g in FIG. 11A are longer and narrower than the protrusion features 106g in FIG. 11B, which is compressed due to the force applied to one or both of the smartphone 404a and the lens structure 100g.

In certain embodiments, the lens structure can be used without a computing device. One example is as follows: The lens structure is sandwiched between two microscope slides. A microscopic specimen is placed on the outside surface of the microscope slide directly in front on the convex lens protrusion. The system is then held directly in front of the eye with the non-sample side facing the eye. The two microscope slides are squeezed together to adjust focus of the system. Decreasing the distance between the system and the eye increases the apparent size of the image. Optional backlighting can enhance the brightness of the image.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary PDMS lenses generally described above.

For instance, in the foregoing description, certain specific details are set forth in order to provide a thorough understanding of various disclosed embodiments. One skilled in the relevant art will recognize that embodiments may be practiced without one or more of these specific details, or with other methods, components, materials, etc. not shown or described in detail to avoid unnecessarily obscuring descriptions of the embodiments.

Those skilled in the art will appreciate that the lenses taught herein are capable coupling with computing devices that take a variety of forms. Examples of such computing devices include, but are not limited to, the following: cameras, cell phones, smartphones, tablets, webcams, laptop computers, netbooks, gaming devices, navigation devices, smart watches, wearable computers, smart printers, television devices, multimedia devices, handheld computers, palm computers, and the like.

Unless the context requires otherwise, throughout the specification and claims which follow, the word "comprise" and variations thereof, such as, "comprises" and "comprising" are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An elastomer lens structure, comprising:
   an elastomer having base polymer polydimethylsiloxane (PDMS);
   a wafer portion with a top planar surface and a bottom planar surface;
   a convex lens portion having a curved surface, the convex lens portion protruding from the top planar surface of the wafer portion, the curved surface opposed to the top planar surface of the wafer portion;
   an opacity feature integrated in the elastomer lens structure and arranged to restrict light from passing through the elastomer lens structure except where the opacity feature delineates an aperture; and
   at least one deformable protrusion ring rising normal from the top planar surface of the wafer portion, wherein the at least one deformable protrusion ring is arranged as a truncated ring around the convex lens portion.

2. The elastomer lens structure of claim 1, comprising:
   a cross-linking material mixed with the base polymer PDMS, wherein the cross-linking material to base polymer PDMS is mixed in about a 1:15 ratio.

3. The elastomer lens structure of claim 1 wherein the convex lens portion having the curved surface is formed as a hemispherical portion, and wherein the wafer portion is formed as a disc having a diameter that is larger than a diameter of the hemispherical portion.

4. The elastomer lens structure of claim 3 wherein the curved surface of the convex lens portion has a radius of curvature of 3.175 mm, and the convex lens portion protrudes at least 0.75 mm above the wafer.

5. The elastomer lens structure of claim 4 wherein the elastomer lens structure provides a magnification of about 15×.

6. The elastomer lens structure of claim 3 wherein the curved surface of the convex lens portion has a radius of curvature of 0.5 mm, the convex lens portion protrudes at least 0.25 mm above the wafer, and the wafer is about 0.75 mm thick.

7. The elastomer lens structure of claim 6 wherein the elastomer lens structure provides a magnification of about 150×.

8. The elastomer lens structure of claim 1 wherein a radius of curvature of the curved surface of the convex lens portion has a constant radius.

9. The elastomer lens structure of claim 1 wherein the curved surface has an aspheric shape.

10. The elastomer lens structure of claim 1 wherein the opacity feature is integrated with the wafer portion.

11. The elastomer lens structure of claim 1 wherein the opacity feature is deformable to change a size of the aperture.

12. An elastomer lens structure, comprising:
   an elastomer having base polymer polydimethylsiloxane (PDMS);
   a wafer portion with a top planar surface and a bottom planar surface;
   a convex lens portion having a curved surface, the convex lens portion protruding from the top planar surface of the wafer portion, the curved surface opposed to the top planar surface of the wafer portion;
   an opacity feature integrated in the elastomer lens structure and arranged to restrict light from passing through the elastomer lens structure except where the opacity feature delineates an aperture; and
   at least one deformable protrusion formed by a plurality of cylindrical posts rising normal from the top planar surface of the wafer portion.

13. The elastomer lens structure of claim 12 wherein the convex lens portion having the curved surface is formed as a hemispherical portion, and wherein the wafer portion is formed as a disc having a diameter that is larger than a diameter of the hemispherical portion.

14. The elastomer lens structure of claim 13 wherein the curved surface of the convex lens portion has a radius of curvature of 3.175 mm, and the convex lens portion protrudes at least 0.75 mm above the wafer.

15. The elastomer lens structure of claim 14 wherein the elastomer lens structure provides a magnification of about 15×.

16. The elastomer lens structure of claim 13 wherein the curved surface of the convex lens portion has a radius of curvature of 0.5 mm, the convex lens portion protrudes at least 0.25 mm above the wafer, and the wafer is about 0.75 mm thick.

17. The elastomer lens structure of claim 16 wherein the elastomer lens structure provides a magnification of about 150×.

18. The elastomer lens structure of claim 12 wherein a radius of curvature of the curved surface of the convex lens portion has a constant radius.

19. The elastomer lens structure of claim 12 wherein the curved surface has an aspheric shape.

20. The elastomer lens structure of claim 12 wherein the opacity feature is integrated with the wafer portion.

* * * * *